US012706230B2

(12) United States Patent
Varkey et al.

(10) Patent No.: US 12,706,230 B2
(45) Date of Patent: Aug. 11, 2026

(54) CONDUCTIVE OUTER JACKET FOR WIRELINE CABLE

(71) Applicant: Schlumberger Technology Corporation, Sugar Land, TX (US)

(72) Inventors: Joseph Varkey, Richmond, TX (US); Serko Sarian, Houston, TX (US); Qingdi Huang, Sugar Land, TX (US); Tam Tran, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 54 days.

(21) Appl. No.: 18/609,889

(22) Filed: Mar. 19, 2024

(65) Prior Publication Data

US 2024/0221974 A1 Jul. 4, 2024

Related U.S. Application Data

(63) Continuation of application No. 17/059,493, filed as application No. PCT/US2019/034352 on May 29, 2019, now abandoned.

(60) Provisional application No. 62/678,659, filed on May 31, 2018.

(51) Int. Cl.

| | |
|---|---|
| ***H01B 7/22*** | (2006.01) |
| ***H01B 1/20*** | (2006.01) |
| ***H01B 7/18*** | (2006.01) |
| ***H01B 9/00*** | (2006.01) |

(52) U.S. Cl.

CPC ................ *H01B 7/22* (2013.01); *H01B 1/20* (2013.01); *H01B 7/1895* (2013.01); *H01B 9/00* (2013.01)

(58) Field of Classification Search

CPC ........... H01B 7/22; H01B 7/225; H01B 7/226

See application file for complete search history.

(56) References Cited

U.S. PATENT DOCUMENTS 2,604,509 A * 7/1952 Blanchard ............. D07B 1/147 57/214
4,523,804 A 6/1985 Thompson
5,042,903 A 8/1991 Jakubowski
5,150,443 A 9/1992 Wijnberg (Continued)

FOREIGN PATENT DOCUMENTS

CA 2774775 A1 3/2011
CA 2542081 C 3/2012

(Continued)

OTHER PUBLICATIONS

International Search Report and Written Opinion issued in the PCT Application PCT/US2019/034352, dated Sep. 16, 2019 (10 pages).

(Continued)

*Primary Examiner* — Chau N Nguyen
(74) *Attorney, Agent, or Firm* — Kyle R. Miiller

(57) ABSTRACT

A cable containing a conductive outer layer and methods for manufacturing the conductive outer layer and the cable are provided. A cable may include a cable core and a plurality of armor wire strength members that surround the cable core. The cable may also include a conductive outer layer disposed about the plurality of armor wire strength members that physically contacts at least one armor wire strength member of the plurality of armor wire strength members.

6 Claims, 8 Drawing Sheets

(56) References Cited

U.S. PATENT DOCUMENTS

| | | | | |
|---|---|---|---|---|
| 7,285,726 | B2 | 10/2007 | Bremnes | |
| 7,541,543 | B2 | 6/2009 | Head | |
| 9,027,657 | B2 * | 5/2015 | Varkey | D07B 1/147 166/380 |
| 9,368,260 | B2 | 6/2016 | Varkey | |
| 9,691,523 | B2 * | 6/2017 | Pourladian | H01B 7/226 |
| 9,773,583 | B2 | 9/2017 | Leach | |
| 10,210,967 | B2 | 2/2019 | Lee | |
| 11,948,707 | B2 * | 4/2024 | McGovern | H01B 13/26 |
| 2006/0137895 | A1 | 6/2006 | Varkey | |
| 2006/0242824 | A1 | 11/2006 | Varkey | |
| 2007/0044992 | A1 | 3/2007 | Bremnes | |
| 2007/0044993 | A1 | 3/2007 | Varkey | |
| 2007/0107928 | A1 * | 5/2007 | Varkey | H01B 7/046 174/102 R |
| 2010/0108356 | A1 | 5/2010 | Abe | |
| 2011/0240312 | A1 | 10/2011 | Varkey | |
| 2012/0024565 | A1 | 2/2012 | Orini | |
| 2012/0222869 | A1 | 9/2012 | Varkey | |
| 2013/0168126 | A1 | 7/2013 | Kuchta | |
| 2013/0206314 | A1 | 8/2013 | Varkey | |
| 2015/0233200 | A1 | 8/2015 | Varkey | |
| 2016/0024902 | A1 * | 1/2016 | Richter | E21B 47/00 166/250.01 |
| 2021/0210252 | A1 | 7/2021 | Varkey | |

FOREIGN PATENT DOCUMENTS

| | | | |
|---|---|---|---|
| CN | 1881483 | A | 12/2006 |
| CN | 101133464 | A | 2/2008 |

OTHER PUBLICATIONS

First Office Action issued in Chinese Patent Application No. 201980038992.8 dated Oct. 28, 2022, 11 pages (with English Translation).

Second Office Action issued in Chinese Patent Application No. 201980038992.8 dated May 30, 2023, 11 pages (with English Translation).

Fifth Office Action issued in Chinese Patent Application No. MX/a/2020/012975 dated Nov. 8, 2024, 11 pages with English translation.

* cited by examiner

CONDUCTIVE OUTER JACKET FOR WIRELINE CABLE

CROSS REFERENCE PARAGRAPH

This application is a continuation of U.S. patent application Ser. No. 17/059,493, entitled "CONDUCTIVE OUTER JACKET FOR WIRELINE CABLE," filed Nov. 30, 2020, which is a National Stage Entry of International Application No. PCT/US2019/034352, entitled "CONDUCTIVE OUTER JACKET FOR WIRELINE CABLE," filed May 29, 2019, which claims the benefit of U.S. Provisional Application No. 62/678,659, entitled "CONDUCTIVE OUTER JACKET FOR WIRELINE CABLE," filed May 31, 2018, the disclosures of which are hereby incorporated herein by reference.

BACKGROUND

This disclosure relates to a system and method for electrically grounding outer strength member layers of a wellbore cable.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements from downhole well-logging tools that are conveyed deep into the wellbore. The measurements may be used to infer properties and characteristics of the geological formation surrounding the wellbore. Thus, when a wellbore is investigated to determine the physical condition of a fluid within the wellbore, a gas within the wellbore, or the wellbore itself, it may be desirable to place downhole device with associated measurement tools and/or sensors within the wellbore.

A cable may be used to raise or lower the downhole device within a casing of the wellbore. The cable may be formed from a combination of conductors, insulative materials, filler materials, polymer jackets, and armor wire strength members that extend along a length of the cable. In many cases, certain of the conductors are disposed within a protected cable core near a center of the cable. These conductors may transmit electrical energy, such as an electrical current, from a power supply disposed near the surface of the wellbore to the downhole device. As such, the conductors may facilitate remote operation of the downhole device. In certain cases, the armor wire strength members circumferentially surround the cable core and transmit a return electrical current from the downhole device to the power supply. Many cables may include an insulative polymer jacket disposed about the armor wire strength members to smooth an exterior of the cable and facilitate traversing the cable along the wellbore. Yet, as a result, the armor wire strength members could carry an undesirable voltage potential.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one example, a cable includes a cable core and a plurality of armor wire strength members that surround the cable core. The cable also includes a conductive outer layer disposed about the plurality of armor wire strength members that physically contacts at least one armor wire strength member of the plurality of armor wire strength members.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, some wellbore cables may include an insulative polymer jacket that encompasses armor wire strength members extending along a length of the cable. Accordingly, the insulative polymer jacket may inhibit grounding the armor wire strength members to a surrounding environment, such as a casing or an adjacent geological formation, and thus, enable an accumulation of electrical charge within the armor wire strength members. The systems and methods of this disclosure allow for grounding of the armor wire strength members of jacketed wireline cables which may reduce, or substantially eliminate, undesirable buildup of electrical charge and/or undesirable electrical discharge between the cable and the surrounding environment.

Figure 1:
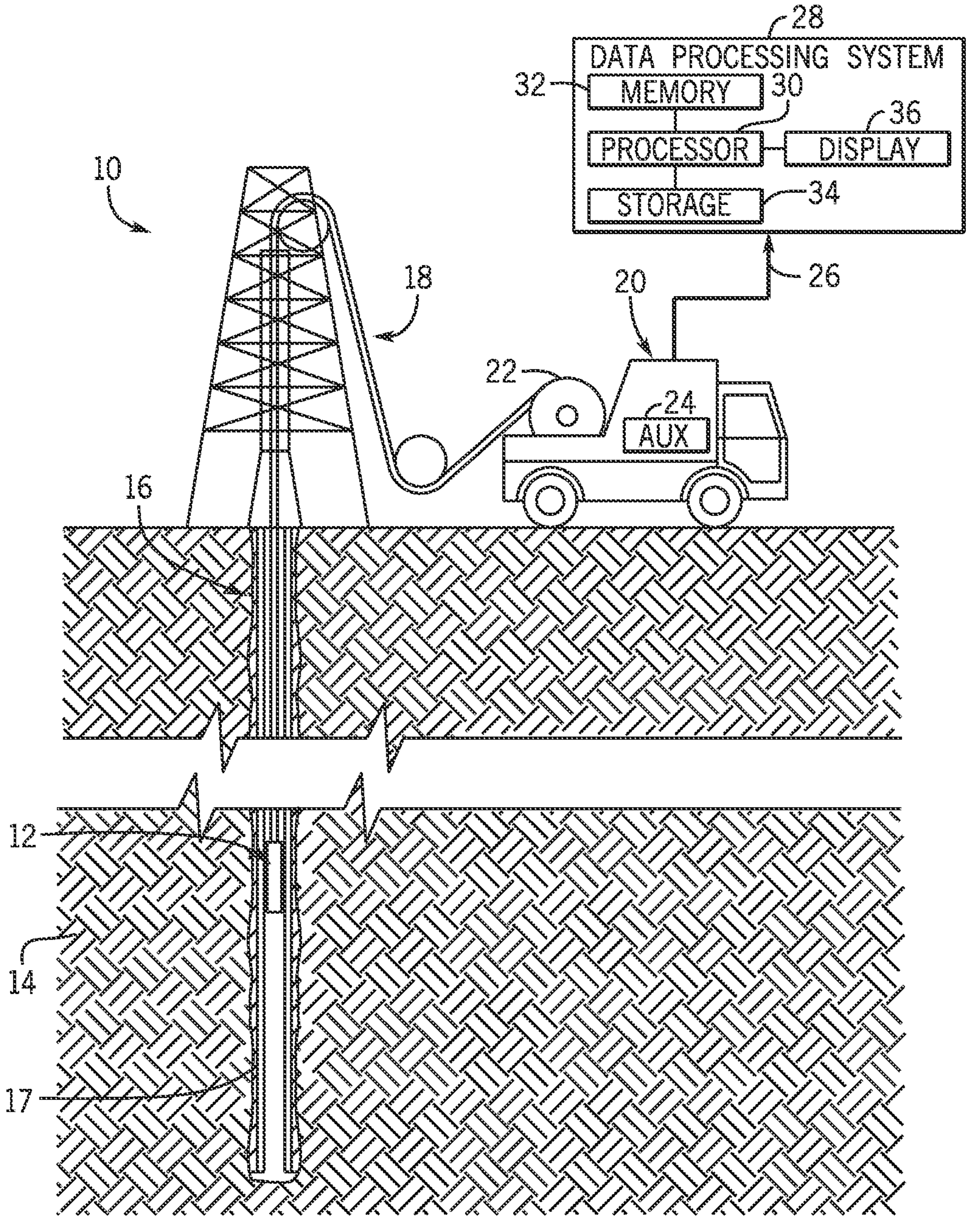
FIG. 1 is a schematic diagram of a wellbore logging system and downhole device that may obtain data measurements along the length of the wellbore, in accordance with an embodiment of the present disclosure.

With this in mind, FIG. 1 illustrates a well-logging system 10 that may employ the systems and methods of this disclosure. The well-logging system 10 may be used to convey a downhole device 12 or a dummy weight through a geological formation 14 via a wellbore 16. In some embodiments, a casing 17 may be disposed within the wellbore 16, such that the downhole device 12 may traverse the wellbore 16 within the casing 17. The downhole device 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any cable 18 suitable for well logging may be used. The cable 18 may be spooled and unspooled on a drum 22 and an auxiliary power source 24 may provide energy to the logging winch system 20 and/or the downhole device 12.

The downhole device 12 may provide logging measurements 26 to a data processing system 28 via any suitable telemetry (e.g., via electrical or optical signals pulsed through the geological formation 14 or via mud pulse telemetry). The data processing system 28 may process the logging measurements. The logging measurements 26 may indicate certain properties of the wellbore 16 (e.g., pressure, temperature, strain, vibration, or other) that might otherwise be indiscernible by a human operator.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties in the geological formation 14 or the wellbore 16 using the logging measurements 26.

Figure 2:
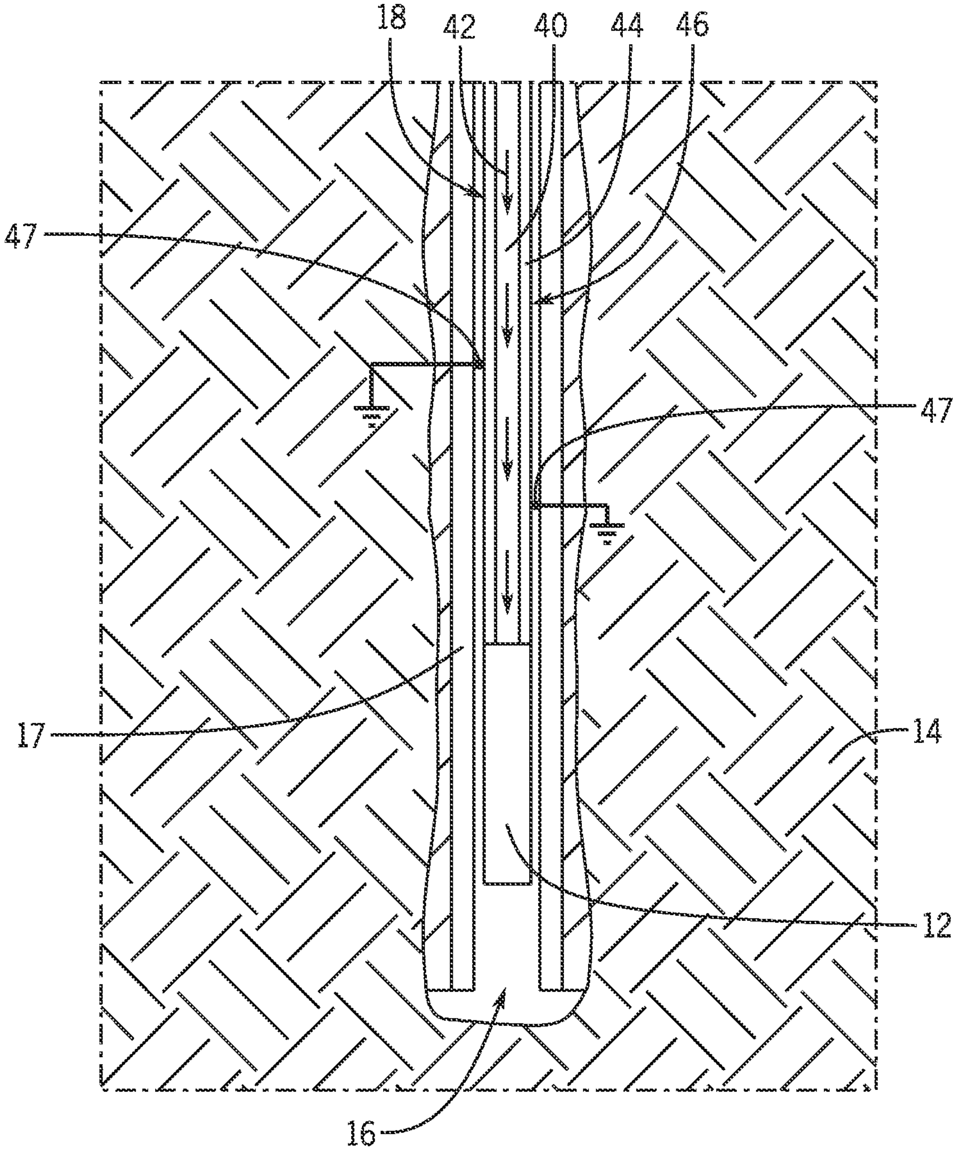
FIG. 2 is a schematic diagram of the downhole device and a cable having a conductive outer layer, in accordance with an embodiment of the present disclosure.

FIG. 2 is a schematic diagram of the cable 18 disposed within the wellbore 16. The cable 18 includes a cable core 40 that extends along a length of the cable 18. The cable core 40 may include several insulated conductors that direct an electrical current 42, or an electrical signal, from a power source, such as the auxiliary power source 24, to the downhole device 12. The insulated conductors may be disposed in configurations such as monocables, coaxial cables, quad cables, heptacables, or any other suitable cable configuration. As described in greater detail herein, the cable 18 includes one or more armor wire strength members that are disposed about the insulated conductors and transmit a return electrical current from the downhole device 12 to the auxiliary power source 24. The cable 18 includes a conductive outer layer 44, which is disposed about and physically contacts the armor wire strength members, thus forming a conductive connection there between. Accordingly, the conductive outer layer 44 forms an exterior surface 46 of the cable 18, which is electrically coupled to the armor wire strength members.

The conductive outer layer 44 physically contacts the casing 17 along one or more points of contact, referred to herein as engagement points 47, which ground the armor wire strength members of the cable 18 to the surrounding casing 17. As described in greater detail herein, the conductive outer layer 44 may thus reduce, or substantially eliminate, a potential difference (e.g., a voltage differential) between the armor wire strength members and a surrounding environment, such as the casing 17, components of the well-logging system 10, and/or the geological formation 14.

As such, undesirable electrical discharge between the armor wire strength members and such surrounding structures may be mitigated.

Although the cable 18 is shown as disposed within the casing 17 in the illustrative embodiment of FIG. 2, it should be noted that in other embodiments, the cable 18 may be used in a wellbore that does not include an outer casing, such as the casing 17. In such embodiments, the conductive outer layer 44 of the cable 18 may physically contact the geological formation 14 encompassing the wellbore 16. Accordingly, the engagement points 47 may directly ground the exterior surface 46 of the cable 18 to the geological formation 14, and thus, similar to the discussion above, substantially reduce or eliminate a potential difference between the armor wire strength members and the environment surrounding the cable 18.

Figure 3:
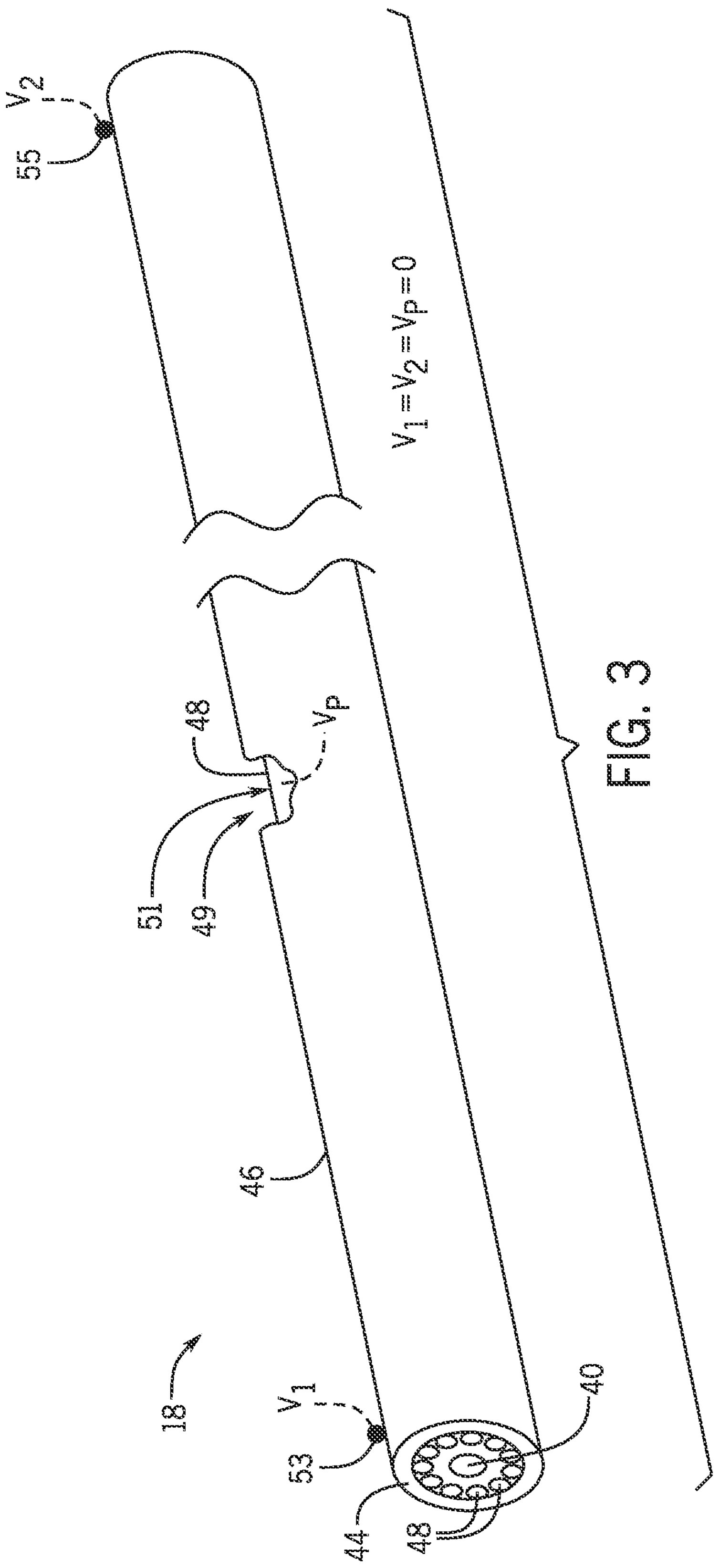
FIG. 3 is a perspective view of the cable having the conductive outer layer, in accordance with an embodiment of the present disclosure.

FIG. 3 illustrates a perspective view of the cable 18. As noted above, the conductive outer layer 44 grounds one or more armor wire strength members 48 disposed within the cable 18 to the surrounding environment, and thus, ensures that a potential difference between the armor wire strength members 48 and the surrounding environment is negligible. For example, in certain cases, the cable 18 may incur wear during operation of the cable 18, such that a puncture 49 is formed within the conductive outer layer 44. The puncture 49 may reveal an exposed portion 51 of the armor wire strength members 48, which is uncovered from the conductive outer layer 44. However, because the armor wire strength members 48 and the conductive outer layer 44 are both grounded via the physical contact between the conductive outer layer 44 and the engagement points 47, a potential difference between the exposed portion 51 and the surrounding environment is substantially small. Accordingly, the conductive outer layer 44 may mitigate, or substantially eliminate undesirable electrical discharge between the exposed portion 51 of the armor wire strength members 48 and the surrounding environment, such as the casing 17, the logging winch system 20, the drum 22, or any other component of the well-logging system 10. Further, the conductive outer layer 44 may ensure that a voltage differential between a first end portion 53 of the cable 18 and a second end portion 55 of the cable 18 is substantially similar. Accordingly, the conductive outer layer 44 may substantially reduce or eliminate the buildup of electrical charge between the first and second end portion 53, 55 of the cable 18.

Figure 4:
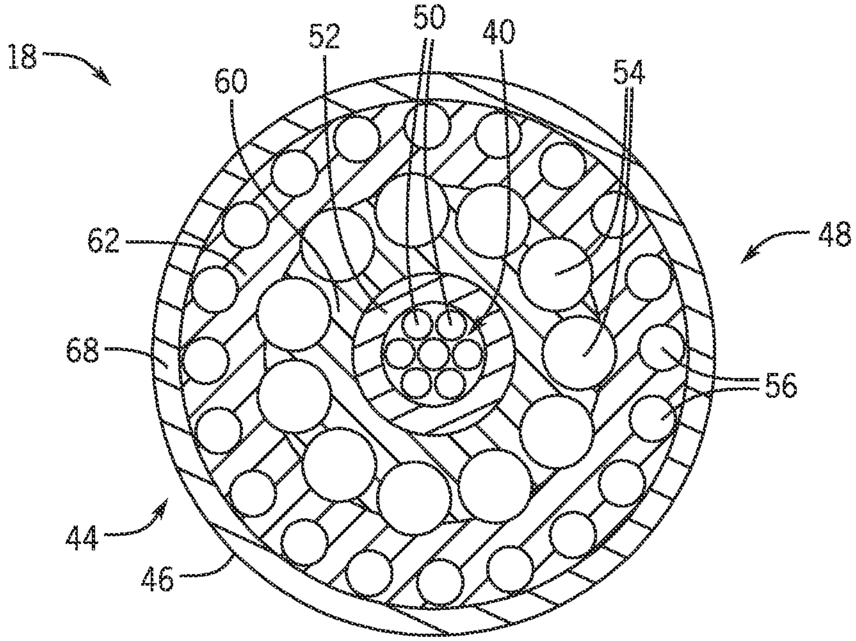
FIG. 4 is a cross-sectional view of the cable, which illustrates a conductive polymer jacket disposed about armor wire strength members of the cable, in accordance with an embodiment of the present disclosure.

FIG. 4 is a cross-sectional view of one embodiment of the cable 18. As noted above, the cable core 40 may include several conductors 50, which are circumferentially encompassed by an insulative layer 52. Accordingly, the insulative layer 52 may substantially block undesirable electrical current flow between the conductors 50 and other portions of the cable 18. The cable core 40 may be encompassed by a pair of concentric armor wire strength member arrays, which collectively form the armor wire strength members 48. For example, the cable core 40 may be circumferentially surrounded by one or more inner armor wire strength members 54, which are circumferentially surrounded by one or more outer armor wire strength members 56.

The armor wire strength members 48 may be served (e.g., coiled helically) around the cable core 40, extend longitudinally along the length of the cable core 40, or be disposed about the cable core 40 in any fashion suitable to surround the cable core 40. The armor wire strength members 48 may physically protect the cable core 40 and may provide additional rigidity to the cable 18. In addition, the armor wire strength members 48 may support the weight of the cable 18 and alleviate strain on the cable core 40. Further, as noted above, the armor wire strength members 48 may conduct an electrical current, for example, between the downhole device 12 and the auxiliary power source 24. For example, the conductors 50 may direct a primary electrical current, such as the electrical current 42, from the axiliary power source 24 to the downhole device 12, while the armor wire strength members 48 direct a return electrical current from the downhole device 12 toward the auxilary power source 24. It should be noted that in other embodiments, the armor wire strength members 48 may include only a single layer of armor wire strength members that circumferentially surround the cable core 40, rather than a pair of concentric layers, such as the inner armor wire strength members 54 and the outer armor wire strength members 56 shown in the illustrative embodiment of FIG. 4.

A first layer of polymeric material 60 is contiguously disposed within interstitial spaces formed between the inner armor wire strength members 54 and the insulative layer 52 of the cable core 40. Similarly, a second layer of polymeric material 62 is contiguously disposed within interstitial spaces formed between the outer armor wire strength members 56 and the first layer of polymeric material 60. However, it should be noted that in other embodiments, the first layer of polymeric material 60 and the second layer of polymeric material 62 may include a single layer of polymeric material that extends between the interstitial spaces of both the inner armor wire strength members 54 and the outer armor wire strength members 56. In some embodiments, the first and second layers of polymeric material 60, 62 may include an insulating material, such as, for example, polytetrafluoroethylene-perfluoromethylvinylether polymer (MFA), perfluoro-alkoxyalkane polymer (PFA), polytetrafluoroethylene polymer (PTFE), ethylene-tetrafluoroethylene polymer (ETFE), ethylene-propylene copolymer (EPC), poly(4-methyl-1-pentene), other polyolefins, other fluoropolymers, polyaryletherether ketone polymer (PEEK), polyphenylene sulfide polymer (PPS), modified polyphenylene sulfide polymer, polyether ketone polymer (PEK), maleic anhydride modified polymers, and any mixtures thereof.

A conductive polymer jacket 68 is disposed about the second layer of polymeric material 62 and forms the conductive outer layer 44 of the cable 18. The conductive polymer jacket 68 includes conductive materials embedded therein, which enhance an electrical conductivity of the conductive polymer jacket 68. As a non-limiting example, materials embedded in the conductive polymer jacket 68 may include conductive carbon black, chopped or milled carbon fiber, chopped metallic fibers, and/or conductive Nano-particles. In other embodiments, a metallic powder may be doped into the conductive polymer jacket 68. The metallic powder may include, but is not limited to, materials such as zinc, copper, iron, or any suitable other conductive metallic particles. Further, it should be noted that in some embodiments, the conductive polymer jacket 68 may include a combination of any of the materials listed above. A doping concentration of the above listed materials within the conductive polymer jacket 68 may be between approximately 0.1% to 30% of a total volume of the conductive polymer jacket 68. However, in other embodiments, the concentration of conductive materials embedded within the conductive polymer jacket 68 may be greater than 30% of the total volume of the conductive polymer jacket 68.

In any case, the conductive polymer jacket 68 may, for example, be extruded about the outer armor wire strength members 56. The conductive polymer jacket 68 may physically contact the outer armor wire strength members 56, and thus, establish an electrical connection there between. As such, the conductive polymer jacket 68 may facilitate grounding the outer armor wire strength members 56 via the engagement points 47 between the exterior surface 46 of the cable 18 and the casing 17. Accordingly, the conductive polymer jacket 68 may substantially reduce or eliminate a buildup of undesirable electric charge within the outer armor wire strength members 56.

Figure 5:
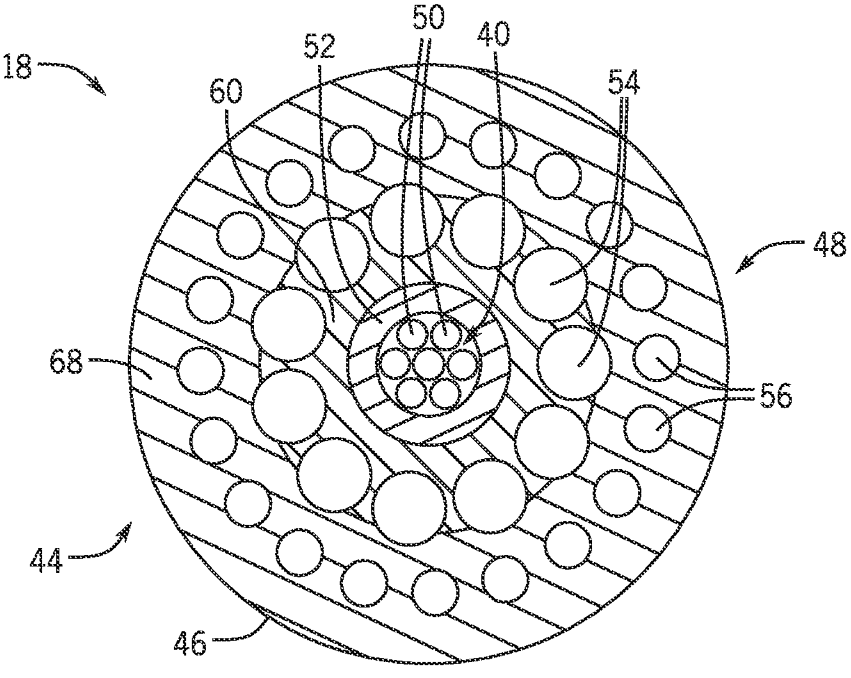
FIG. 5 is a cross-sectional view of the cable, which illustrates the armor wire strength members embedded within the conductive polymer jacket; in accordance with an embodiment of the present disclosure.

Turning now to FIG. 5, in certain embodiments, the conductive polymer jacket 68 may be used in lieu of the second layer of polymeric material 62. In such cases, the outer armor wire strength members 56 are embedded within the conductive polymer jacket 68, such that the conductive polymer jacket 68 may fill interstitial spaces between the outer armor wire strength members 56. For example, the conductive polymer jacket 68 may be heated and melted during assembly of the cable 18, such that the outer armor wire strength members 56 may be rolled into the conductive polymer jacket 68. As such, the conductive polymer jacket 68 may also physically contact the inner armor wire strength members 54. Accordingly, both the inner armor wire strength members 54 and the outer armor wire strength members 56 may be grounded to the casing 17 and/or the geological formation 14 via the conductive polymer jacket 68. In yet further embodiments, the conductive polymer jacket 68 may extend between the exterior surface 46 of the cable 18 and the insulating layer 52 of the conductors 50, thus rendering the first layer of polymeric material 60 obsolete. In such cases, the conductive polymer jacket 68 may fill any interstitial spaces between both the inner and outer armor wire strength members 54, 56.

Figure 6:
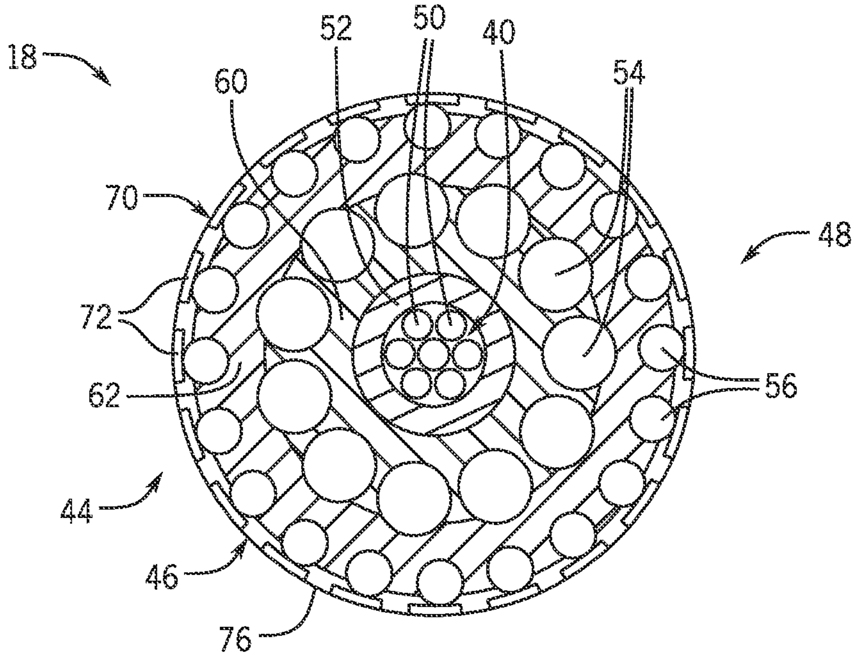
FIG. 6 is a cross-sectional view of the cable, which illustrates a conductive flat wire array disposed about the armor wire strength members, in accordance with an embodiment of the present disclosure.
Figure 7:
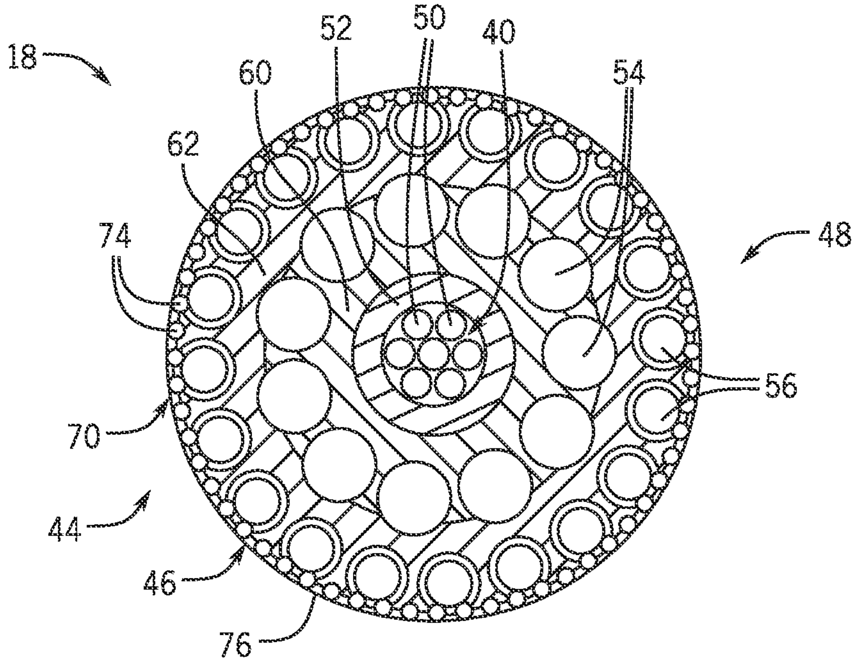
FIG. 7 is a cross-sectional view of the cable, which illustrates a conductive round wire array disposed about the armor wire strength members, in accordance with an embodiment of the present disclosure.

Turning now to FIGS. 6 and 7, which illustrate a cross-sectional view of the cable 18 in which the conductive outer layer 44 is formed from a conductive wire array 70. The wire array 70 may be served (e.g., coiled helically) around the second layer of polymeric material 62, extend longitudinally along the length of the second layer of polymeric material 62, or be disposed about the second layer of polymeric material 62 in any fashion suitable to surround second layer of polymeric material 62. Each wire of the wire array 70 may include flat steel or alloy wire 72, as shown in FIG. 6, or a round steel or alloy wire 74, as shown in FIG. 7. Additionally or otherwise, each wire of the wire array 70 may include a key stone shaped wire, or any other suitable cross-section of wire. In some embodiments, the wire array 70 may include a combination of two or more of the wire types listed above. For example, the wire array 70 may include a combination of both the flat steel or alloy wire 72 and the round steel or alloy wire 74. An interstitial space formed between individual wires of the wire array 70 may be occupied by a pack-off material 76, such as rubber, polymer, epoxy resin, or the like. Accordingly, the pack-off material 76 may smoothen an exterior surface of the wire array 70 or, in other words, the exterior surface 46 of the cable 18, which may facilitate traversing the cable 18 along the wellbore 16. However, it is important to note that the pack-off material 76 does not extend over a radially outermost surface of the wire array 70. In other words, an outer surface of each wire of the wire array 70 remains exposed, such that the wire array 70 may physically contact the casing 17 at the engagement points 47.

In some embodiments, the wire array 70 may cover approximately 5% to 90% of the exterior surface 46 of the cable 18. The wire array 70 may physically contact one or more armor wires of the outer armor wire strength members 56, and thus, establish an electrical connection there between. For example, in certain embodiments, the wire array 70 may be embedded within the second layer of polymeric material 62 during manufacturing of the cable 18, and thus, physically contact the outer armor wire strength members 56. In other embodiments, the outer armor wire strength members 56 may radially extend beyond the second layer of polymeric material 62, and thus, facilitate conductive contact with the wire array 70 disposed circumferentially thereabout. In any case, the wire array 70 may ground the outer armor wire strength members 56 via the engagement points 47 between the wire array 70 and the casing 17 and/or the geological formation 14.

Figure 8:
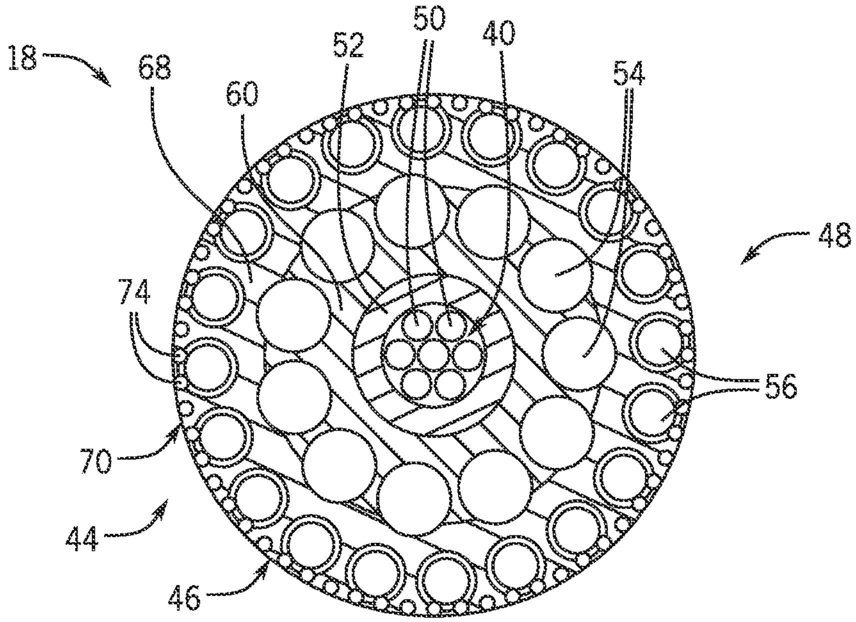
FIG. 8 is a cross-sectional view of the cable, which illustrates the conductive round wire array disposed about the conductive polymer jacket, in accordance with an embodiment of the present disclosure.

It should be noted that in some embodiments, the wire array 70 may be used in conjunction to the conductive polymer jacket 68 discussed above. For example, as illustrated in FIG. 8, the inner and outer armor wire strength members 54, 56 may be embedded, or partially embedded within the conductive polymer jacket 68, and thus, establish a conductive connection there between. The wire array 70 may be circumferentially disposed about the conductive polymer jacket 68. Accordingly, the wire array 70 conductively engages with both the outer armor wire strength members 56 and the inner armor wire strength members 54 via the conductive polymer jacket 68. In further embodiments, the wire array 70 may be embedded within the conductive polymer jacket 68 and provide additional support or protection to the conductive polymer jacket 68. In such embodiments, the conductive polymer jacket 68 may fill interstitial gaps between each wire of the wire array 70, and thus, smoothen the exterior surface 46 of the cable 18. In other words, the conductive polymer jacket 68 may be used in lieu of the pack-off material 76 in such embodiments.

Figure 9:
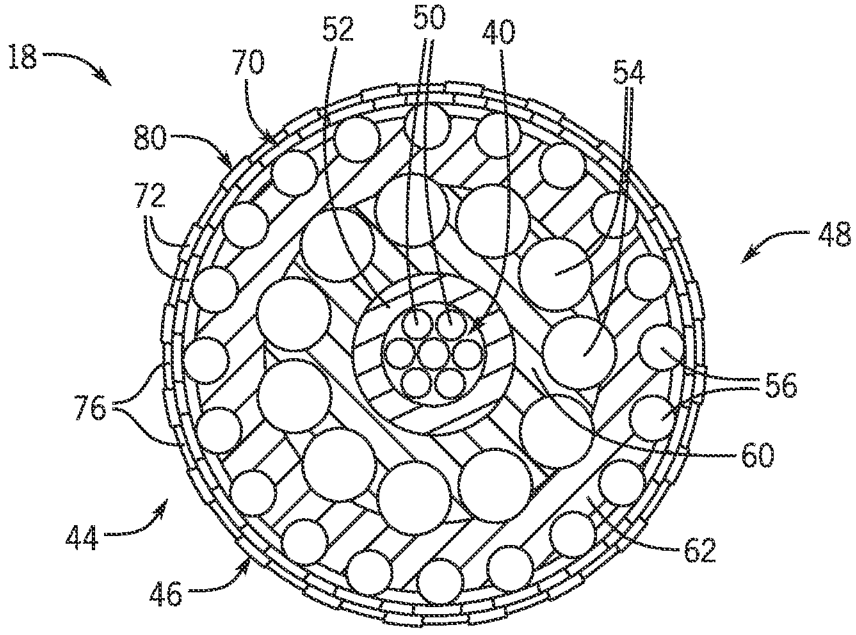
FIG. 9 is a cross-sectional view of the cable, which illustrates a multi-layered conductive flat wire array disposed about the armor wire strength members, in accordance with an embodiment of the present disclosure.
Figure 10:
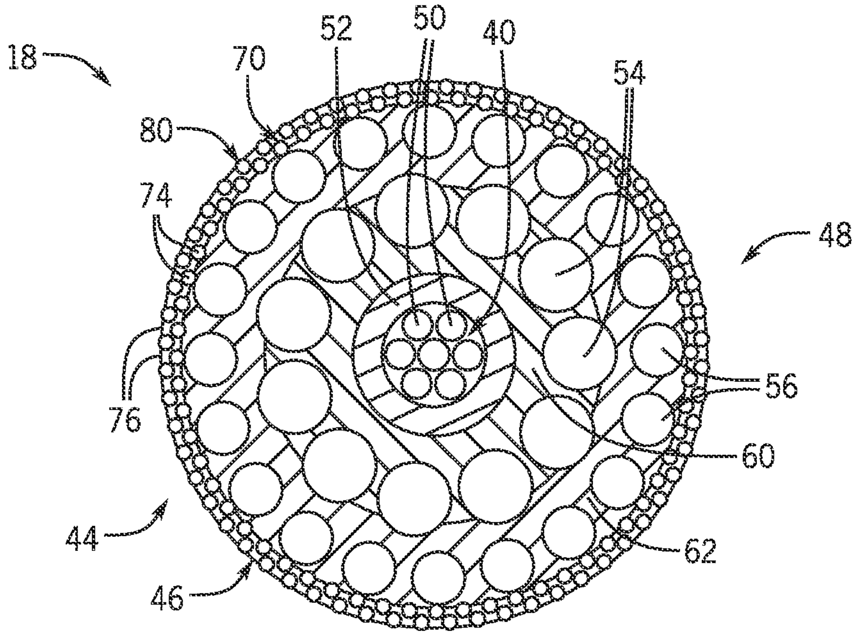
FIG. 10 is a cross-sectional view of the cable, which illustrates a multi-layered conductive round wire array disposed about the armor wire strength members, in accordance with an embodiment of the present disclosure.
Figure 11:
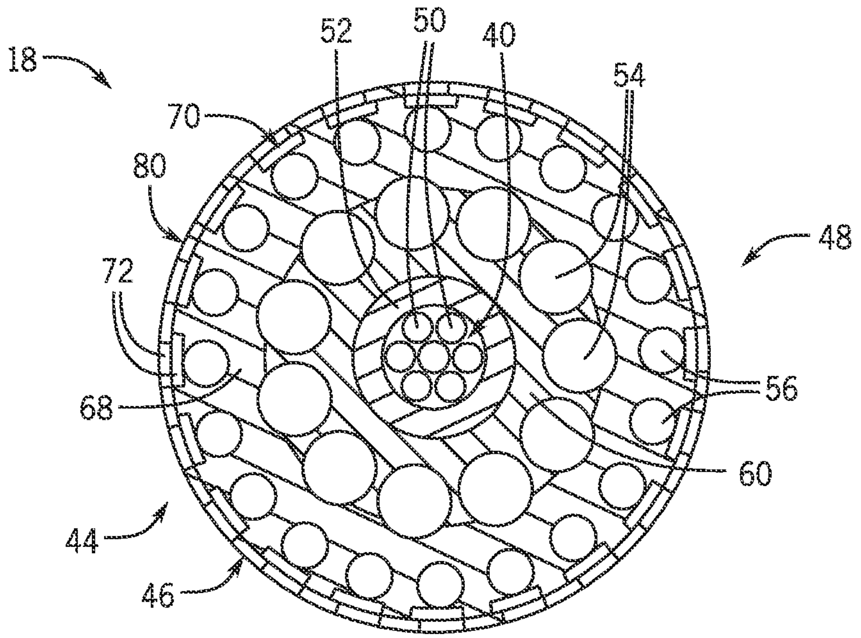
FIG. 11 is a cross-sectional view of the cable, which illustrates the multi-layered conductive round wire array disposed about the conductive polymer jacket, in accordance with an embodiment of the present disclosure.

In some embodiments, the cable 18 may include multiple concentric layers of wire array disposed about the exterior surface 46 of the cable 18. For example, FIGS. 9, 10, and 11 illustrate FIGS. 6, 7, and 8, respectively, having an additional wire array 80 disposed about the wire array 70. The additional wire array 80 may be configured similar to the wire array 70 discussed above, and provide further protection to the cable 18 from wear and/or abrasion, such as when the cable 18 traverses the wellbore 16 or is unspooled or spooled from the drum 22. It is important to note that one of ordinary skill in the art would appreciate that the exterior surface 46 of the cable 18 is not limited to two layers of wire arrays, such as the wire array 70 and the additional wire array 80. For example, the cable 18 may include 1, 2, 3, 4, 5, 6, or more layers of wire array that form the exterior surface 46 of the cable 18, and thus, form the conductive outer layer 44.

Figure 12:
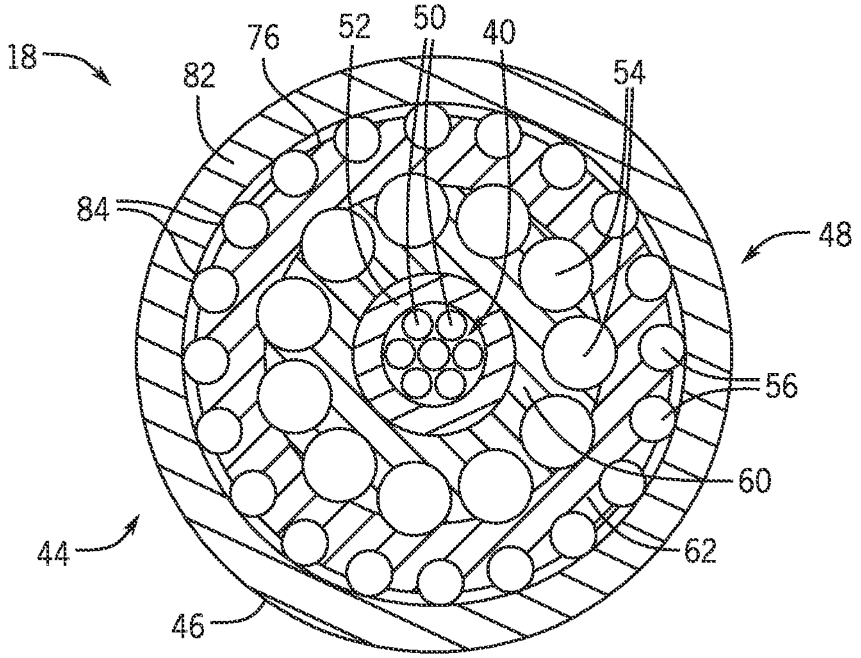
FIG. 12 is a cross-sectional view of the cable, which illustrates a conductive tape disposed about the armor wire strength members, in accordance with an embodiment of the present disclosure.

FIG. 12 illustrates a cross-sectional view of the cable 18 in which the conductive outer layer 44 of the cable 18 is formed from a metallic tape 82 (e.g., a metallic mesh). For example, in some embodiments, a pack-off material, such as the pack-off material 76, is disposed between interstitial gaps of the outer armor wire strength members 56 and the second layer of polymeric material 62. Accordingly, the pack-off material 76 may provide a smooth circumferential surface onto which the metallic tape 82 may adhere. It is important to note that a contact patch 84 of the outer armor wire strength members 56 remains uncovered by the pack-off material 76. The contact patch 84 may include a surface area located near the radially outermost point of each of the outer armor wire strength members 56, relative to a center of the cable 18. The metallic tape 82 is disposed about the outer armor wire strength members 56 of the cable 18, such that a conductive connection is established between the contact patch 84 and the metallic tape 82. The metallic tape

82 may be served (e.g., coiled helically) around the outer armor wire strength members 56, extend longitudinally along the outer armor wire strength members 56, or be disposed about the outer armor wire strength members 56 in any fashion suitable to surround the outer armor wire strength members 56.

Figure 13:
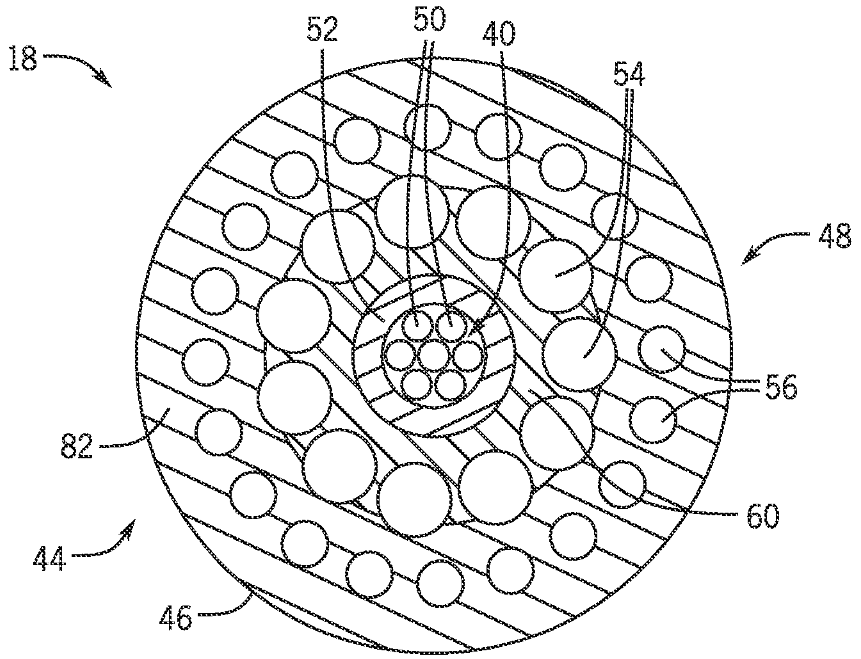
FIG. 13 is a cross-sectional view of the cable, which illustrates the armor wire strength members embedded within the conductive tape, in accordance with an embodiment of the present disclosure.

Turning now to FIG. 13, in other embodiments, the outer armor wire strength members 56 may be embedded within the metallic tape 82. For example, the metallic tape 82 may be applied about each wire of the outer armor wire strength members 56 in layers during assembly of the cable 18 and, as such, embed each of the outer armor wire strength members 56 within the metallic tape 82. In such embodiments, the metallic tape 82 may replace the second layer of polymeric material 62, such that the metallic tape 82 may physically contact the inner armor wire strength members 54. Accordingly, the metallic tape 82 may conductively couple both the inner and outer armor wires strength members 54, 56 to the exterior surface 46 of the cable 18. The metallic tape 82 may thus ground the inner and outer armor wire strength members 54, 56 during operation of the cable 18 within the wellbore 16 and/or while spooling or unspooling from the drum 22.

In certain cases, the metallic tape 82 may extend from the exterior surface 46 of the cable 18 to the insulating layer 52 of the conductors 50, and thus, render the first layer of polymeric material 60 obsolete. For example, in such cases, the metallic tape 82 may be wrapped about each wire of the inner armor wire strength members 54 in addition to each wire of the outer armor wire strength members 56 during assembly of the cable 18. Still further, the metallic tape 82 may be heated to melt, and thus, form a continuous layer of metallic tape extending between the interstitial gaps of the inner and outer armor wire strength members 54, 56.

It is important to note that the embodiments of the cable 18 discussed above need not include the conductive outer layer 44 along an entire length of the cable 18. For example, the conductive outer layer 44 may be disposed along certain portions of the cable 18, while other portions of the cable 18 include a conventional polymeric outer jacket. Additionally or otherwise, a composition of the conductive outer layer 44 may change along the length of the cable 18. For example, certain portions of the cable 18 may include the conductive polymer jacket 68, while other portions of the cable 18 include the wire array 70, the metallic tape 82, or a combination thereof.

The specific embodiments described above have been shown by way of example, and it should be understood that these embodiments may be susceptible to various modifications and alternative forms. The disclosed embodiments are suitable for any cable application requiring an electrically conductive surface disposed about an outer circumference a cable, such as wireline cables, wireline cables with embedded strength members, marine cables, or any other suitable cables. It should be further understood that the claims are not intended to be limited to the particular forms disclosed, but rather to cover all modifications, equivalents, and alternatives falling within the spirit and scope of this disclosure.

The invention claimed is:

1. A cable comprising:

a cable core comprising a plurality of conductors surrounded by an insulative layer;

a first polymeric material surrounding the insulative layer;

a first plurality of armor wire strength members that surround the cable core, the first polymeric material disposed between adjacent armor wire strength members of the first plurality of armor wire strength members;

a second polymeric material surrounding the first plurality of armor wire strength members, the second polymeric material contacting the first polymeric material and each armor wire strength member of the first plurality of armor wire strength members;

a second plurality of armor wire strength members surrounding the first plurality of armor wire strength members, the second polymeric material disposed between adjacent armor wire strength members of the second plurality of armor wire strength members;

a conductive outer layer forming an exterior surface of the cable and comprising a plurality of alloy wires, wherein each alloy wire of the plurality of alloy wires contacts a single corresponding armor wire strength member of the second plurality of armor wire strength members such that a number of armor wire strength members of the second plurality of armor wire strength members equals a number of alloy wires of the plurality of alloy wires; and a pack off material disposed within interstitial spaces of the plurality of alloy wires and contacting the second plurality of armor wire strength members, the pack off material defining the exterior surface.

2. The cable of claim 1, wherein a layer of insulating polymeric material is disposed within the interstitial spaces between the second plurality of armor wire strength members and the conductive outer layer.

3. The cable of claim 1, wherein the conductive outer layer comprises a conductive wire array including the plurality of alloy wires.

4. The cable of claim 3, wherein each wire of the plurality of alloy wires is exposed at a corresponding engagement point configured to contact a geological formation encompassing a wellbore in which the cable is disposed.

5. The cable of claim 1, wherein the pack off material comprises at least one of a rubber, polymer, or epoxy resin.

6. The cable of claim 1, wherein:

the plurality of alloy wires is a first plurality of alloy wires; and the conductive outer layer further comprises a second plurality of alloy wires.

* * * * *